United States Patent
Pettey et al.

(10) Patent No.: US 10,688,775 B2
(45) Date of Patent: Jun. 23, 2020

(54) METHOD OF MANUFACTURING CONTAINMENT BLADDERS

(71) Applicant: RESPONSE TECHNOLOGIES, LLC, Providence, RI (US)

(72) Inventors: David A. Pettey, Westport, MA (US); Edmund F. Bard, Cumberland, RI (US)

(73) Assignee: RESPONSE TECHNOLOGIES, LLC, Providence, RI (US)

( * ) Notice: Subject to any disclaimer, the term of this patent is extended or adjusted under 35 U.S.C. 154(b) by 573 days.

(21) Appl. No.: 15/098,783

(22) Filed: Apr. 14, 2016

(65) Prior Publication Data

US 2016/0303799 A1  Oct. 20, 2016

Related U.S. Application Data

(60) Provisional application No. 62/148,406, filed on Apr. 16, 2015.

(51) Int. Cl.
*B65D 65/42* (2006.01)
*B33Y 80/00* (2015.01)
*B33Y 10/00* (2015.01)

(52) U.S. Cl.
CPC ............ *B33Y 80/00* (2014.12); *B33Y 10/00* (2014.12); *B65D 65/42* (2013.01)

(58) Field of Classification Search
CPC ................................ B33Y 80/00; B33Y 10/00
See application file for complete search history.

(56) References Cited

U.S. PATENT DOCUMENTS

| 2,736,356 | A | * | 2/1956 | Oates, Jr. | B60K 15/03177 222/107 |
|---|---|---|---|---|---|
| 3,313,664 | A | * | 4/1967 | Reinhart, Jr. | B29C 53/602 156/155 |
| 3,470,928 | A | | 10/1969 | Schwartz | |
| 3,648,650 | A | | 3/1972 | Joy | |
| 3,664,904 | A | * | 5/1972 | Cook | B64D 37/06 428/102 |
| 3,703,201 | A | | 11/1972 | Musyt et al. | |
| 3,831,939 | A | | 8/1974 | Lorber | |
| 3,835,605 | A | | 9/1974 | Ueno | |
| 4,193,518 | A | | 3/1980 | Holmes | |
| 4,660,594 | A | | 4/1987 | Gocze | |
| 4,865,096 | A | | 9/1989 | Schober et al. | |
| 5,314,653 | A | | 5/1994 | Haralambopoulos | |
| 5,368,395 | A | | 11/1994 | Crimmins | |
| 5,509,255 | A | | 4/1996 | Rutledge | |

(Continued)

OTHER PUBLICATIONS

Teng—http://www-eng.lbl.gov/~shuman/NEXT/MATERIALS%26COMPONENTS/Pressure_vessels/filament_wound_pv_optimal_design.pdf (Year: 2005).*

(Continued)

*Primary Examiner* — Leith S Shafi
*Assistant Examiner* — Nicholas R Krasnow
(74) *Attorney, Agent, or Firm* — Lando & Anastasi, LLP

(57) ABSTRACT

A method of manufacturing a seamless, non-wicking containment bladder includes providing yarn materials, coating the yarn materials with a precursor protective coating, loading the yarn materials into an additive manufacturing process, depositing the yarn materials in pre-selected amounts and locations to form a desired structure, forming and heat-setting, and coating the seamless bladder.

16 Claims, 5 Drawing Sheets

(56) References Cited

U.S. PATENT DOCUMENTS

| | | | |
|---|---|---|---|
| 5,590,803 A | 1/1997 | Kaempen | |
| 5,687,434 A | 11/1997 | Tagg | |
| 5,772,938 A | 6/1998 | Sharp | |
| 5,809,650 A | 9/1998 | Reese et al. | |
| 5,910,138 A | 6/1999 | Sperko et al. | |
| 6,021,915 A | 2/2000 | Shimozono et al. | |
| 6,145,692 A | 11/2000 | Cherevatsky | |
| 6,267,399 B1* | 7/2001 | Buckmiller | B29C 53/824 |
| | | | 280/274 |
| 6,715,644 B2 | 4/2004 | Wilford | |
| 8,790,565 B2 | 7/2014 | Miller | |
| 8,916,249 B2 | 12/2014 | Liang et al. | |
| 9,533,526 B1 | 1/2017 | Nevins | |
| 2002/0117781 A1 | 8/2002 | LeBreton | |
| 2004/0086720 A1* | 5/2004 | Gan | C08G 59/18 |
| | | | 428/413 |
| 2004/0202807 A1* | 10/2004 | Earnest | F16L 59/143 |
| | | | 428/36.1 |
| 2006/0039780 A1* | 2/2006 | Butcher | B21D 51/383 |
| | | | 413/67 |
| 2006/0078234 A1 | 4/2006 | Chandra et al. | |
| 2007/0196651 A1 | 8/2007 | Tijink et al. | |
| 2008/0272116 A1* | 11/2008 | Martucci | F02M 37/007 |
| | | | 220/4.13 |
| 2010/0086721 A1 | 4/2010 | Batchelder | |
| 2010/0314386 A1 | 12/2010 | Buonerba et al. | |
| 2012/0305711 A1* | 12/2012 | Shannon | B64D 37/02 |
| | | | 244/135 B |
| 2012/0315569 A1 | 12/2012 | Tanigawa et al. | |
| 2013/0130029 A1 | 5/2013 | Hirose et al. | |
| 2013/0158494 A1 | 6/2013 | Ong et al. | |
| 2013/0277372 A1 | 10/2013 | Waku | |
| 2013/0284303 A1* | 10/2013 | Gauckler | F16L 9/133 |
| | | | 138/145 |
| 2014/0339745 A1 | 11/2014 | Uram | |
| 2015/0045907 A1 | 2/2015 | Sambusseti | |
| 2015/0291332 A1* | 10/2015 | Misciagna | B60K 15/03177 |
| | | | 220/560.03 |
| 2016/0176124 A1* | 6/2016 | Tranquart | B29C 70/48 |
| | | | 264/103 |
| 2016/0177078 A1 | 6/2016 | Naito et al. | |
| 2017/0253760 A1* | 9/2017 | Zheng | C09D 127/16 |
| 2017/0320588 A1* | 11/2017 | Briand | B32B 7/12 |
| 2018/0362794 A1* | 12/2018 | Ferkel | C09D 127/18 |

OTHER PUBLICATIONS

"Lubin"—Chiao, C.C., Chiao, T.T. and Lubin, G., 1982. Handbook of Composites. by G. Lubin, Van Nostrand Reinhold, New York. (Year: 1982) Chapter 13.*
http://www.shimaseiki.com/producl/knit/mach2x/index2.html, (Year: 2018).*
https://www.staubli.com/en-us/textile/textile-machinery-solutions-jacquard-weaving/unival-100/ (Year: 2018).*

* cited by examiner

METHOD OF MANUFACTURING CONTAINMENT BLADDERS

RELATED APPLICATIONS

This application claims priority under 35 U.S.C. § 119(e) to U.S. Provisional Application Ser. No. 62/148,406 titled "Method of Manufacturing Containment Bladders" filed on Apr. 16, 2015, which is herein incorporated by reference in its entirety.

BACKGROUND OF THE INVENTION

The present disclosure is directed to solid, liquid and gas handling systems and more particularly to a method of manufacturing containment bladders for the cost effective storage and transportation of various solids, liquids, and gases.

The transportation, storage and protection of a diverse variety of solids, liquids, and gases, such as fuels, chemicals, air, foodstuffs, organic materials, water, and liquids, have been greatly limited by the currently used materials and fabrication techniques. Typical handling systems include storage units that incorporate protective materials that have been uniquely matched to the contents they contain. These materials can be expensive, and may only be compatible with one solid, liquid, or gas to be transported. In addition, the methods of fabricating the current storage units are capital intensive, often requiring major set-up charges for unique dies and tools for each rigid product produced. Consequentially, the prohibitive cost results in less product available to the mass market. For example, explosion-proof fuel systems are commonplace within professional racing circuits, but have not been availed to the commercial automotive market, which experiences approximately 230,000 vehicle fires per year in the United States alone.

The current manufacturing process requires a time-consuming and costly supply chain, including about four to five levels of highly capital-intensive vertical steps. These four to five steps are typically performed by unique entities, with very few entities fully integrated with each other. This long and complex supply chain has limited product innovation, and has high waste factors and lead-times as a result. A fundamental consequence of the limitations of the current process is that lighter, more functional, less expensive, and better designed products are not being introduced to the market.

The current storage unit fabrication processes, such as the tank or bladder assembly process, rely on a labor intensive cut-and-sew operation. The current methods for assembling the storage units require high waste factors, and heavier weight materials. Patterns are cut from rolled goods, and the unused materials are wasted as scrap. Seaming the parts together to make the final containment bladder requires extra material to produce overlapped seams, skilled labor, and aggressive adhesive chemistries. The fabrication method itself, which may include thermoplastic welded or adhered seams, translates to the primary mode of failure for the final product.

To address the shortcomings of current storage containers and the methods of making the same, there is a need for additively manufacturing containment bladders for the cost effective storing and transportation of various solids, liquids, and gases whereby the primary mode of failure in the current units is obviated. Specifically, the method of the present disclosure provides numerous advantages over current methods of fabricating storage units. For example, the improved process enables the use of higher strength and higher performance materials. In addition, the improved additive processes allow for the flexible and rapid manufacturing of unique tank and bladder designs. The improved process can also allow for the manufacture of containment bladders having universal containment protection that are compatible with all materials to be stored and/or transported. Furthermore, the improved storage containers may be up to about 40 percent lighter in weight, and may be more readily scalable than current storage containers.

SUMMARY

In one aspect of the present disclosure, a method of manufacturing a seamless, non-wicking containment bladder comprises providing yarn materials, coating the yarn materials with a precursor protective coating, loading the yarn materials into an additive manufacturing machine, and depositing the yarn materials in pre-selected amounts and locations to form a desired three-dimensional (3D) structure.

In some embodiments, the method further comprises heat setting the desired 3D structure to produce a final form. In some embodiments, heat setting comprises heating the desired 3D structure at about 200° C. to about 500° C. In some embodiments, heat setting comprises heating the desired 3D structure for about 1 minute to about 10 minutes. In some embodiments, the method further comprises applying a pressure to the desired 3D structure. In some embodiments, the pressure applied to the desired 3D structure is between about −1 bar and about 9 bar. In some embodiments, the method further comprises applying a final coating material or combination of materials to the final form. In some embodiments, the final coating material or combination of materials comprises a thermoplastic resin. In some embodiments, the final coating material or combination of materials comprises polyvinylidene fluoride.

In some embodiments, the yarn materials comprise high tenacity yarns or a combination of high tenacity and performance yarns. In some embodiments, the yarn materials comprise thermoplastic yarns and/or combinations of thermoplastic and high performance yarns.

In some embodiments, the precursor protective coating comprises polyvinylidene fluoride and/or thermoplastic resins and alloys, or combinations of resins and alloys.

In some embodiments, depositing the yarn materials comprises executing a computer aided design program.

In one aspect of the present disclosure, a containment bladder is formed by the above method.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1A:
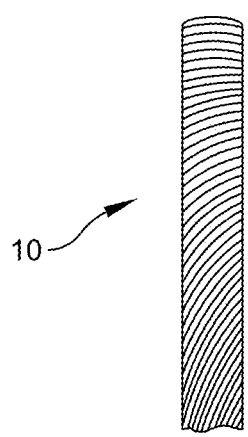
FIG. 1a is a view of a yarn in accordance with one embodiment of the disclosure.

The following detailed description is of the best currently contemplated modes of carrying out exemplary embodiments of the disclosure. The description is not to be taken in a limiting sense, but is made merely for the purpose of illustrating the general principles of the present disclosure.

Broadly, an embodiment of the present invention provides a method of manufacturing containment bladders for the safer, more cost effective storing and transportation of various solids, liquids, and gases whereby the primary mode of failure found in the current methods and devices is obviated. The primary mode of failure found in the current methods and devices is seam failure. The method relies on additive manufacturing techniques to precisely fabricate containment bladders and prevent waste. The method may include multiple steps performed by integrated entities. In some embodiments, the method may include providing high tenacity yarns uniquely selected based on predetermined design specifications; coating the selected yarns with a precursor protective coating; dimensioning and adapting the containment bladder within a CAD-Knitting software application; fabricating selected yarns in a 3D knitting or weaving machine loaded with the CAD-Knitting or CAD-Weaving software applications; heat-setting and molding a final form of the containment bladder; applying to the formed containment bladder a unique final coating; and, in certain embodiments, applying to the formed containment bladder unique connections, attachments, and components pursuant to the predetermined design specifications.

Referring to the drawings, methods of the present disclosure enable the cost effective manufacture of design-to-need light weight, flexible, storage tanks/containment bladders. Because the methods of the present disclosure may dramatically reduce the cost of manufacture, more expensive higher performance materials can be used in construction. In addition, universally compatible materials can be used that afford the product universal protection across a wide range of stored products. In such an embodiment, the same containment bladders would have equal efficacy across all solid, liquid and gas contents, for example, fuels, chemicals, and water.

The method may include providing high tenacity yarns 10, as illustrated in FIG. 1a, which are uniquely selected based on the predetermined design specifications so as to achieve the optimal design properties, such as resulting weight, and puncture, tear, and tensile strength. In some embodiments, the high tenacity yarns may be selected based on strength, durability, and/or life expectancy. The high tenacity yarns may be any yarn, or combination of yarns suitable to the end use of the containment vessel. For example, the high tenacity yarn may comprise aramids, polyether ether ketone (PEEK), HT-Polyester, HT-Nylon, HT-Polypropylene, poly(p-phenylene-2,6-benzobisoxazole) (PBO), carbon-based yarn, meta-aramids, and combinations thereof. In certain embodiments, the selection pallet of high tenacity yarns may be restricted to thermoplastic yarns, as the final three-dimensional (3D) structure may need to be thermally heat-set to hold its form. For example, in applications where the containment vessel is fit or nested within an existing compartment, the shape and dimensions of the final product need to be precisely sized and set. Explosion resistant fuel bladders used in professional racing circuits require such precision.

Figure 1B:
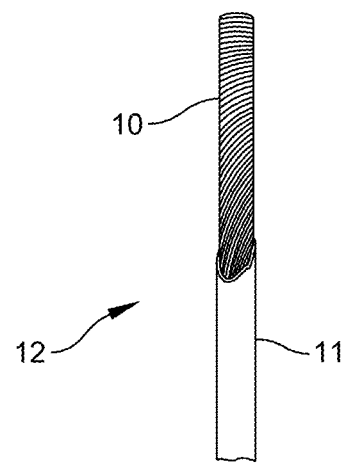
FIG. 1b is a view of a coated yarn in accordance with one embodiment of the disclosure.

Next, the method may include coating the selected yarns 10 with a precursor protective coating 11. The coated yarn 12 is illustrated in FIG. 1b. The precursor protective coating 11 may be a thermoplastic and elastomeric covering or otherwise compatible with the final film or coating. The application of this precursor chemistry may provide an initial protective barrier around the selected yarns 10. In certain embodiments, the precursor protective coating 11 may be adapted to directly adhere to the selected yarns 10, and subsequently adhere to the final film or coating. In some embodiments, the yarns 10 may need to be first treated in order for the coating 11 to sufficiently anchor to the yarn system 10. The pretreatments may be physical or chemical, and there are many applications known to the art. In some embodiments, thermoplastic chemistries may be ideal precursor protective coatings, since they may further assist in the shaping of the 3D containment bladder structure. The fabric coating process may have a variety of available commercial solutions, and may be a function of the size and shape of the containment bladder, as well as the chemistry selection itself. The fabric coating process may not be necessary for all applications. For example, where strength, protection, and longevity requirements are low, a precursor coating may not be required. In the case of high explosion resistant and crash surviving flexible fuel tanks, a coating 11, atop yarn 10 is necessary to prevent wicking of the fuel being contained in the tank itself. Fuel wicking into the fabric structure is a primary mode of failure for the current art.

In some embodiments, the precursor protective coating 11 may be polyvinylidene fluoride (PVDF). PVDF has a long life expectancy and is high resistant to a large range of fluids. For example, harsh chemicals and high ethanol content fuels. This is an improvement over the traditionally used polyurethane, which has a shorter lifespan, and is not universally compatible across a broad range of containment liquids, solids, and gases.

Figure 1C:
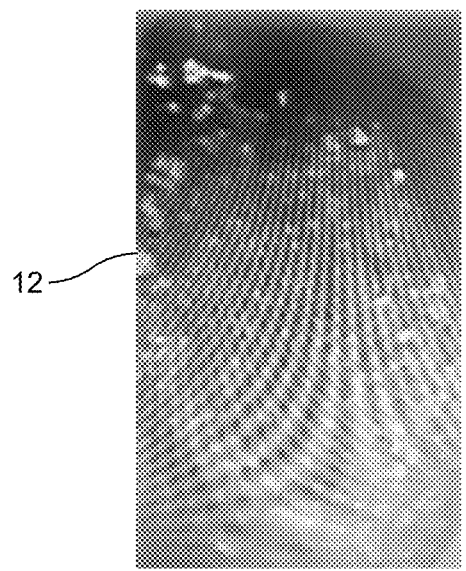
FIG. 1c is a cross-sectional view of the coated yarn.

The precursor protective coating 11 may be applied by any processes that are capable of precisely coating the yarn. For example, the precursor protective coating 11 may be robotically applied, based on a pre-determined computer program. Where precision and cost are not critical, the coating 11, may also be applied through a dipping and drying process. FIG. 1c illustrates the cross-section of the coated yarn 12 shown in FIG. 1b. The thickness and uniformity of the coating impacts the manufacturing process and the performance of the containment bladder. The thinner the application of the coating, the easier it is for the coated yarns to undergo the subsequent textile formation process, such as knitting or weaving. The thicker the coating, the greater the coating protects the final containment bladder by limiting the potential for the containment fluid to breach the coating barrier. Containment fluids breaching the final coating barrier enables fluids to wick into the textile structure. Wicking of fluids into the textile structure is a key cause of accelerated failures in current containment bladders.

The containment bladder may be dimensioned and adapted within a CAD-Knitting or CAD-Weaving additive manufacturing software application. Using the yarns 10 and coated yarns 12 that were selected during the previous steps, the containment bladder may be virtually assembled via a CAD program, whereby the shape, physical, and aesthetic features of the containment bladder 25 are formed. This step requires the expertise of a fabric designer, coupled with the technical knowledge of a textile engineer. The designer may construct the fabrics to their desired shape, while the engineer selects the number, location, size, and types of yarns that are in the structure in order to achieve the predetermined product design specifications.

Figure 2A:
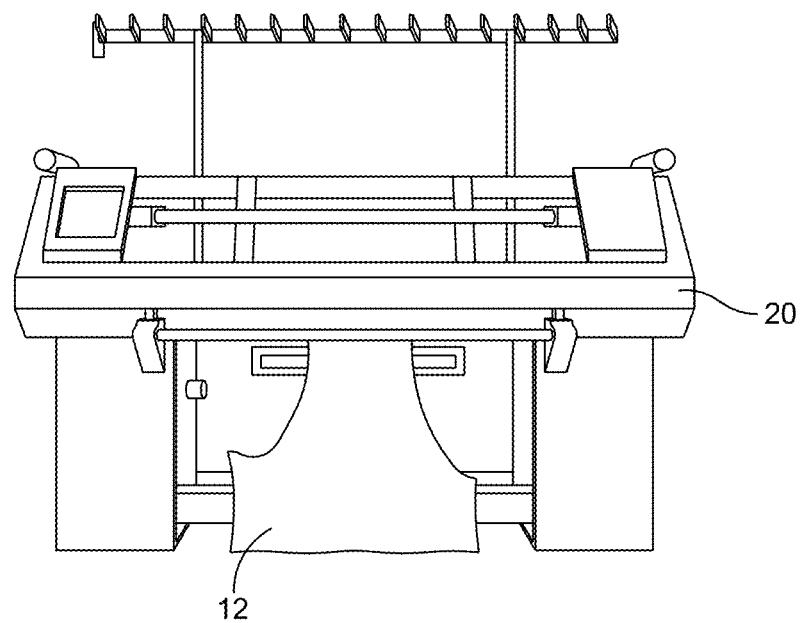
FIG. 2a is a front perspective view of a 3D knitting machine.
Figure 2B:
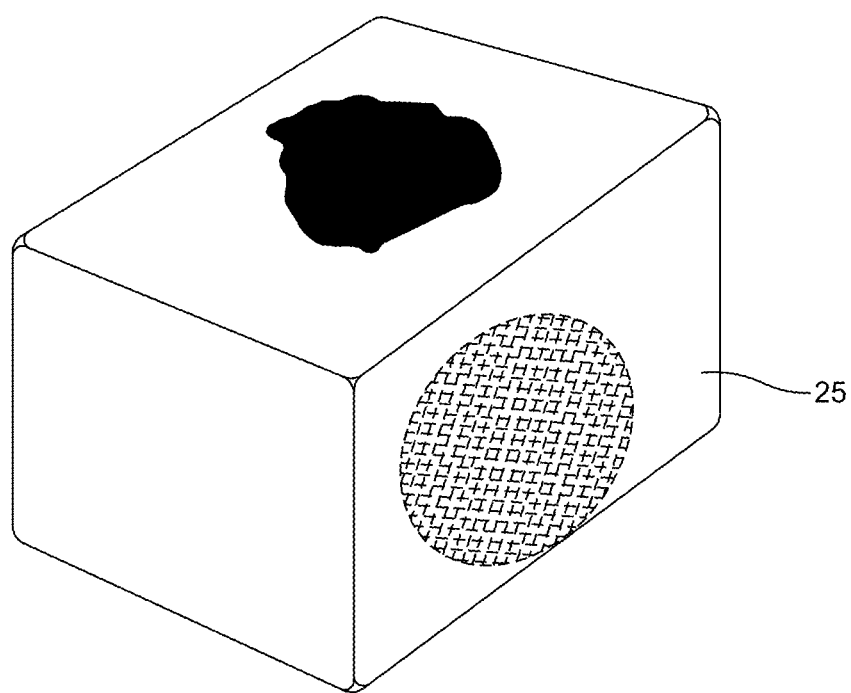
FIG. 2b is a perspective view of an uncoated formed containment bladder in accordance with one embodiment of the disclosure.

The selected coated yarns 12 may be fabricated in a 3D knitting (i.e., additive manufacturing) machine 20, as illustrated in FIG. 2a, loaded with the pre-designed CAD-Knitting software application. This step substantially produces the containment bladder in its preliminary form (FIG. 2b). The selected combination of yarns 10, and/or, coated yarns 12 may be fed into the 3D knitting machine 20, and deposited according to the uploaded pre-designed CAD program. The CAD information may be loaded into the programmable logic control (PLC) of the 3D knitting additive manufacturing machine 20, and the yarns 10, and/or, 12 may be placed where they are uniquely fed into the 3D knitting machine 20 as and where needed. The 3D knitting machine 20 is uniquely able to construct the final product so that no cutting, sewing, or seaming is needed. Further, yarns are only consumed within the structure as needed, optimizing cost and physical performance. Finally, yarns of different types and/or constructions of different densities can be strategically placed within the final product. For example, the design of a vessel may be optimized by deploying HT-polyethylene terephthalate (HT-PET) yarns within the body of the vessel, and the corners may be reinforced with aramid yarns. In some embodiments, vessels having attachments and ports connected to them may need a denser construction with unique yarns at the attachment points.

In the next step, the containment bladder may be heat-set and molded to its final form 25. The completed 3D structure from the printing stage can have a loose shape, and may lack sufficient rigidity or self-supporting form, so it may be heat-set and formed via a molding or thermo-forming process. The heat-setting process may enable the form to be compatible with the final coating process step. For this reason, a preparation process involving heat and pressure may be used to set the structure into its final form. This setting process has the added benefit of causing the thermoplastic coatings on the yarns to begin to flow and merge with neighboring yarns, forming a structural bridge over the interstices of the textile structure. The molding process may not be necessary for all applications. For example, where the containment bladder needs to be kept more flexible, and where a more amorphous final shape is tolerable. An automotive driver side airbag may be a specific example of a containment bladder requiring flexibility. A further example may be stand-alone auxiliary fuel or water tanks, where the resulting unfilled vessels are far more flexible and collapsible, and have increased payload capacities.

The heat setting step may occur at elevated temperatures. An elevated temperature may be any temperature above room temperature of the polymer being used, to a temperature approaching its melting point. In some embodiments, the heat setting step may include heating the containment bladder at about 200° C. to about 500° C. The containment bladder may be heat for about 1 minute to about 10 minutes. The heat setting step also may occur at varied pressures. The pressure may be any pressure at, above, or below atmospheric pressure. The range of pressures can vary greatly, and can depend on whether the product is sucked into the mold by a vacuum-forming negative pressure, or blow into the mold using positive pressure. The pressure may range from about −1 bar to about 9 bar. In some embodiments, the ideal operating pressure range is from about −0.5 bar to about 2.5 bar. Cycle times are optimized by increasing the time and pressure, while limiting the set-up time.

Figure 3:
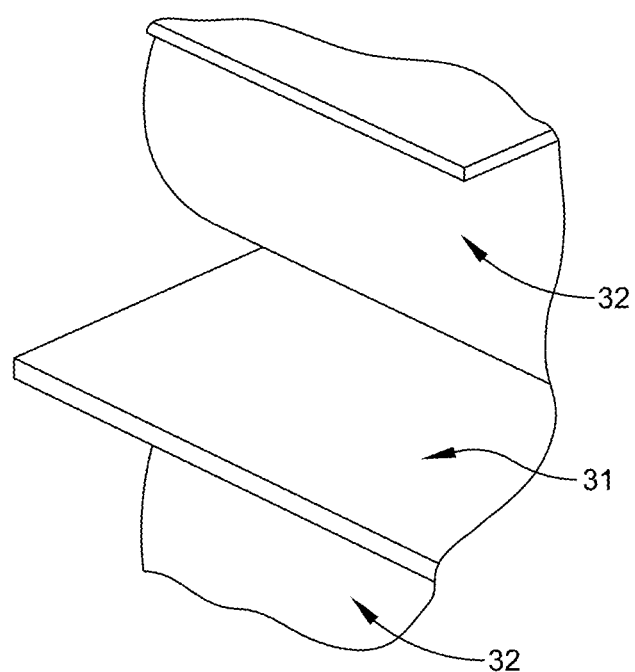
FIG. 3 is a perspective view of the application of a precursor coating to the formed containment bladder in accordance with one embodiment of the disclosure.

In certain embodiments, a unique final coating 32 may be precisely applied to the textile scaffold 31 of the formed containment bladder 25 with the compatible type and thickness of protective chemistry, as shown in FIG. 3. The amount and type of chemistry applied may be governed by the predetermined design specifications, aesthetics, and cost considerations. Specific thermoplastic and elastomeric chemistries may be selected so as to afford the desired predetermined design specifications. The thermoplastic chemistries may be selected to provide, for example, chemical, fuel, fire, heat, static, bio absorption, or UV resistance. FDA approved chemistries may also present a consideration for potable applications. Further, the chemistries may be compatible with the coating process itself, for example, by spraying, extruding, hot melt coating, blow molding, or laminating. The fabric coating process may have a variety of available commercial solutions, and may be a function of the size and shape of the tank/bladder, as well as the chemistry selection itself. The fabric coating process may not be necessary for all applications; for example, where strength, protection, and longevity requirements are low.

Figure 4:
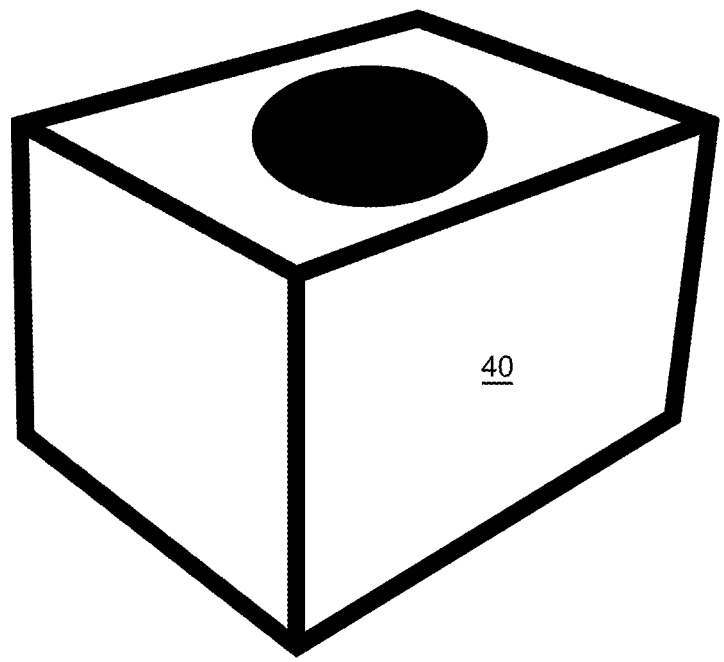
FIG. 4 is a perspective view of the containment bladder.

In some embodiments, the unique final coating 32 may be polyvinylidene fluoride (PVDF). PVDF has a long life expectancy and is resistant to a wide range of: fluids, gases, and solids, as well as being highly heat resistant. In some embodiments, the final coating 32 may be applied by the same means of applying the precursor coating 11. For example, the final coating 32 may be applied precisely through robotic means by way of programmed instructions. The containment bladder may be formed to its final shape 40 after the application of the unique final coating, as illustrated in FIG. 4. Using appropriate thermal spraying techniques, different coating surfaces can be applied to the containment vessel. For example, the inside of a containment vessel may be coated with PVDF 32 if the containment vessel will contain fuels or aggressive chemistries. Meanwhile, the outside of the tank may be coated with a lower cost thermoplastic polyurethane (TPU) 32 that is better suited for UV resistance and protection from the elements.

Finally, in certain embodiments, unique connections, attachments, and components may be applied to the containment bladder, based at least in part on the predetermined design specification. These additions may be, for example, connection ports, breather valves, grounding connections, or anti-sloshing foams. In some embodiments, some connection ports will have been built into the design at the CAD program process. Others may be simple and/or small cut-outs from the containment bladder at the end of the manufacturing process. Anti-sloshing baffles/foams can be extruded in-situ using blowing agents or metered gases in the extrusion process, or converted from bun stock of reticulated foam, subsequently placed in the finally formed tank/bladder.

Figure 5:
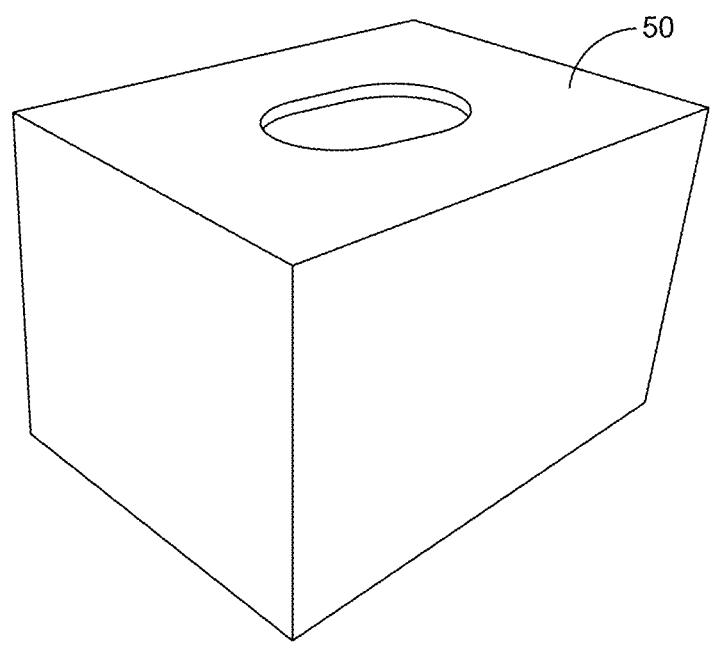
FIG. 5 is a perspective view of a final containment bladder in accordance with one embodiment of the disclosure.

The containment bladder may be formed into its final shape 50 after the addition of connections, attachments, and/or components. In some embodiments, in the absence of additional connections, attachments, and components, the containment bladder may be formed into its final shape 40 after the application of the unique final coating. A final containment bladder 50 is illustrated in FIG. 5.

Figure 6:
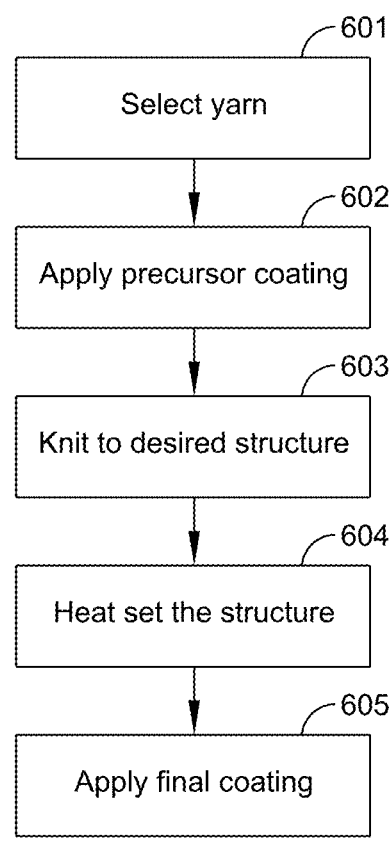
FIG. 6 is a schematic diagram of an exemplary method of manufacturing a containment bladder of an embodiment of the disclosure.

As shown in FIG. 6, a method of manufacturing a containment bladder may include the following processing steps: selecting a yarn (Step 601); applying a precursor coating to the yarn (Step 602); knitting the yarn to a desired structure (Step 603); heat setting the structure (Step 604); and applying a final coating (Step 605). In some embodiments, the method may further comprise adding connections, attachments, and/or further components. By following the aforementioned steps, a user may obviate the typical containment bladder's primary mode of failure, which is the contents leaking at the fabricated seams, and/or, wicking of the contents into the textile scaffold. Further, the user may be able to vertically integrate their operations, as well as greatly increase the diversity of their product offerings. Moreover, users will benefit from a reduced cost, a less complicated and shortened supply chain, a lower working capital cost, products that are significantly lighter in weight, and products having significantly reduced carbon footprint as compared to the current containment bladders and methods of fabricating the same.

The methods disclosed herein may achieve highly automated operations. The methods may involve very low labor components and a small cellular manufacturing operation, which could be highly productive and design agile. For example, the 3D textile process may have an operational footprint of less than 100 $ft^2$, whereas traditional textile processes including warping, weaving, cutting and sewing typically take up more than 2,000 $ft^2$. In addition, the coating process of the current art can conservatively take up more than 2,000 $ft^2$, while the molding and robot-controlled spraying systems of the present disclosure may take up less than 200 $ft^2$. The cumulative additive manufacturing processes require only 10% of the floor space requirements of the current subtractive manufacturing processes. Finally, the utilization of robotic controls for applying the coating systems is not only a labor and space savings advantage, but is a necessary technology component for ensuring the precision of the coating layers consistently meet exacting thickness levels Like the 3D textile process, the use of robotic controls may enable the application of different chemistries or having different coating levels at unique areas of the vessel design. For example, the design may be more robust if added amounts of coating were applied at the mounting locations of the connectors.

In alternative embodiments, the present disclosure may include methods of manufacturing oil booms, automotive airbags, integrated impact protection performance wear, micro fuel cells (for example, for use on drone and other unmanned ground and air craft), bio-medical structures and biomimetic devices, inflatable watercraft hulls, and the like. An automotive airbag, for example, may use a silicone coating 11 on top of the high tenacity yarn 10. Further, given the soft edges of an automotive airbag, the object 25, would not likely need to undergo a forming or heat setting process.

It should be understood, of course, that the foregoing relates to exemplary embodiments of the disclosure and that modifications may be made without departing from the spirit and scope of the present disclosure. Those skilled in the art should appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. For example, those skilled in the art may recognize that the system, and components thereof, according to the present disclosure may further comprise a network or systems or be a component of containment bladder manufacturing system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise a containment bladder manufacturing system or components of a containment bladder manufacturing system. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of manufacturing a seamless, non-wicking containment bladder, comprising:
   providing yarn materials;
   coating the yarn materials with a precursor protective coating;
   loading the yarn materials into an additive manufacturing machine; and depositing the yarn materials in pre-selected amounts and locations to form a desired 3D structure that is seamless, the step of depositing including forming different coating levels at different locations on the containment bladder by depositing a first type of yarn in a body of the containment bladder and reinforcing the first type of yarn with a second type of yarn at one or more of corners of the containment bladder and attachment points on the containment bladder, wherein the precursor protective coating includes polyvinylidene fluoride.

2. The method of claim 1, further comprising heat setting the desired 3D structure to produce a final form.

3. The method of claim 2, wherein heat setting comprises heating the desired 3D structure at about 200° C. to about 500° C.

4. The method of claim 3, wherein heat setting comprises heating the desired 3D structure for about 1 minute to about 10 minutes.

5. The method of claim 2, further comprising applying a pressure to the desired 3D structure.

6. The method of claim 5, wherein the pressure applied to the desired 3D structure is between about −1 bar and about 9 bar.

7. The method of claim 2, further comprising applying a final exterior coating material or combination of materials to the final form.

8. The method of claim 7, wherein the final exterior coating material or combination of materials comprises a thermoplastic resin.

9. The method of claim 8, wherein the final exterior coating material or combination of materials comprises polyvinylidene fluoride.

10. The method of claim 1, wherein the yarn materials comprise one of aramids, polyether ether ketone (PEEK), HT-Polyester, HT-Nylon, HT-Polypropylene, poly(p-phenylene-2,6-benzobisoxazole) (PBO), carbon-based yarn, meta-aramids, and combinations thereof.

11. The method of claim 10, wherein the yarn materials comprise thermoplastic yarns.

12. The method of claim 1, wherein the precursor protective coating further includes thermoplastic, elastomeric resins and alloys, or combinations of resins and alloys.

13. The method of claim 1, wherein depositing the yarn materials comprises executing a computer aided design program.

14. The method of claim 1, wherein reinforcing the first type of yarn with the second type of yarn includes reinforcing the first type of yarn with the second type of yarn at corners of the containment bladder.

15. The method of claim 1, wherein the first type of yarn is a HT-polyethylene terephthalate yarn, and the second type of yarn is an aramid yarn.

16. The method of claim 1, wherein the step of depositing includes forming different coating levels at different locations on the containment bladder by depositing the first type of yarn in the body of the containment bladder and reinforcing the first type of yarn with the second type of yarn at the corners of the containment bladder.

* * * * *